Jan. 25, 1938.  E. P. SEXTON  2,106,491
FLUID PRESSURE BRAKE
Filed Nov. 5, 1936
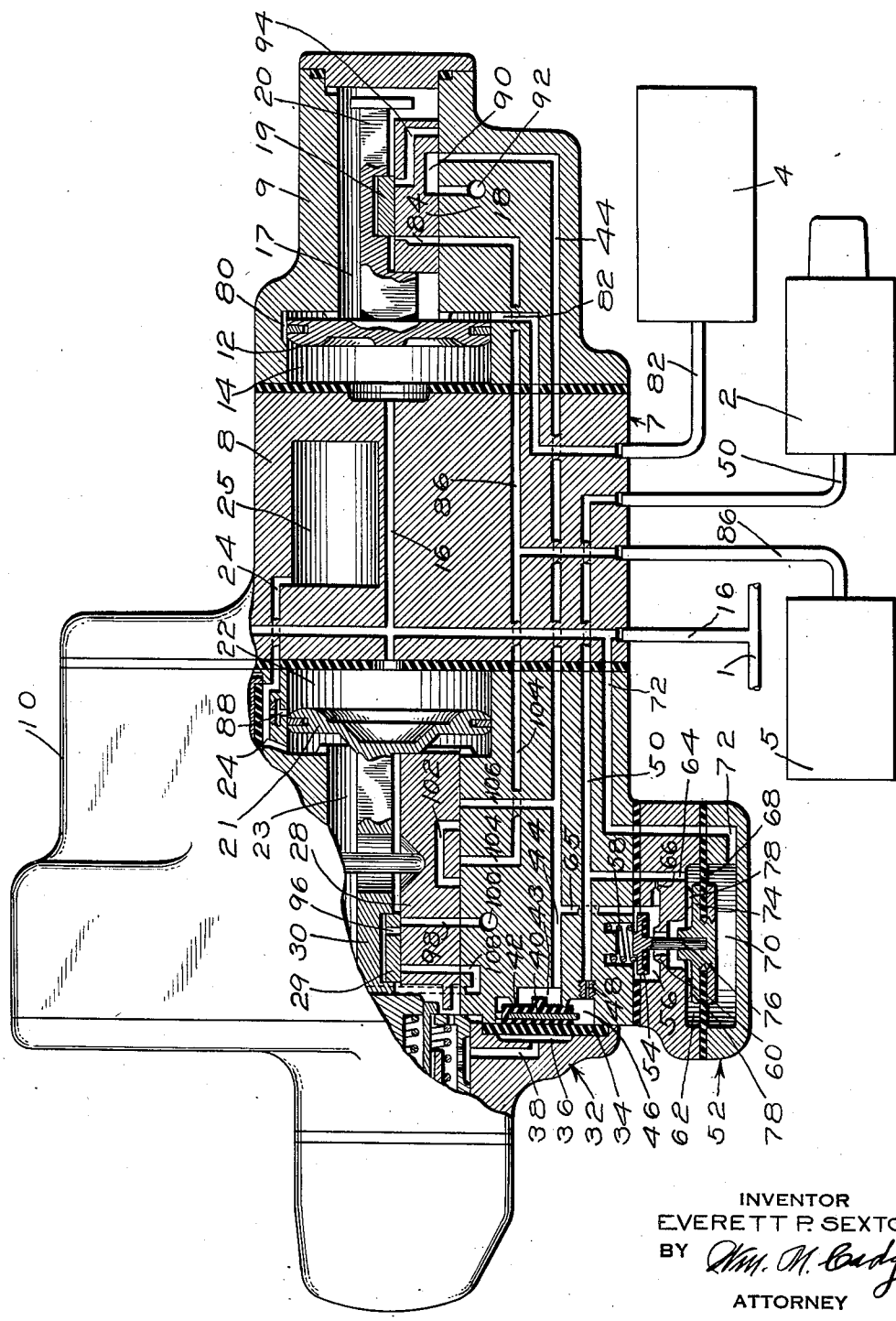
INVENTOR
EVERETT P. SEXTON
BY
ATTORNEY Patented Jan. 25, 1938

2,106,491

UNITED STATES PATENT OFFICE 2,106,491

FLUID PRESSURE BRAKE

Everett P. Sexton, East McKeesport, Pa., assignor to The Westinghouse Air Brake Company, Wilmerding, Pa., a corporation of Pennsylvania Application November 5, 1936, Serial No. 109,272

11 Claims. (Cl. 303—46)

This invention relates to fluid pressure brakes in which the brakes are applied and released by varying the fluid pressure in the brake pipe.

It has heretofore been proposed to provide a brake equipment of the above type in which in effecting an emergency application of the brakes, fluid under pressure is supplied to the brake cylinder at three different rates. Fluid under pressure is supplied initially at a rapid rate until sufficient pressure is developed in the brake cylinder to produce a brake application capable of producing sufficient braking force to cause a mild gathering of the slack in the train. The rate of supply of fluid to the brake cylinder is then restricted for a period of time long enough to normally permit the slack in the train to gather, after which fluid under pressure is supplied to the brake cylinder at a rapid rate to develop the maximum braking force available to stop the train in the minimum time and distance.

A fluid pressure brake equipment having the above feature by which on an emergency application of the brakes there is an initial inshot of fluid under pressure to the brake cylinder at a rapid rate, followed by a slow build up of brake cylinder pressure, and thereafter followed by a final inshot of fluid under pressure to the brake cylinder at a rapid rate is disclosed in U. S. Patent No. 2,013,231, issued February 18, 1936 to Clyde C. Farmer.

It is an object of this invention to provide a brake equipment of the type shown in the above identified patent, and incorporating improved means to restrict the rate of flow of fluid to the brake cylinder following an initial inshot of fluid thereto at a rapid rate.

A further object of the invention is to provide a brake equipment of the type described, and incorporating valve means subject to the opposing pressures of the fluid in the brake pipe and of the fluid supplied to the brake cylinder for controlling the rate of supply of fluid to the brake cylinder on an emergency application of the brakes.

Another object of the invention is to provide an improved fluid pressure brake equipment.

Other objects and features of the invention and of novelty will be apparent from the following description taken in connection with the accompanying drawing, the single figure of which is a diagrammatic view, largely in section, of a brake equipment embodying my invention.

The brake equipment shown in the drawing is similar to the equipment shown in the above identified patent, and only such portions of the equipment are illustrated and described herein as are essential to the understanding of this invention.

As shown in the drawing the equipment comprises a brake pipe 1, a brake cylinder 2, an auxiliary reservoir 4, an emergency reservoir 5, and a brake controlling valve device indicated generally by the reference numeral 7. The brake controlling valve device 7 comprises a pipe bracket section 8, a service portion 9, and an emergency portion 10.

The service portion 9 comprises a body having a bore therein in which is mounted a piston 12 having at one side thereof a chamber 14, which is constantly connected by way of a branch passage and pipe 16 with the brake pipe 1. The piston 12 has at the other side thereof a valve chamber 17 in which is mounted a main slide valve 18, and an auxiliary slide valve 19 having movement relative to the main slide valve 18. The main slide valve 18 and the auxiliary valve 19 are operated by means of a stem 20 formed integral with the piston 12.

The emergency portion 10 comprises a body having a bore therein in which is mounted a piston 21 having at one side thereof a chamber 22 which is constantly connected by way of the branch passage and pipe 16 with the brake pipe 1. The piston 21 has at the other side thereof a valve chamber 23 which is constantly connected by way of a passage 24 with a quick action chamber 25 formed in the pipe bracket section 8.

The valve chamber 23 has mounted therein a main slide valve 28 and an auxiliary slide valve 29 having movement relative thereto. These slide valves are operated by means of a stem 30 formed integral with the piston 21.

The emergency portion includes a timing valve device, indicated generally by the reference numeral 32, and comprising a movable abutment in the form of a flexible diaphragm 34 which is subject on one face to the pressure of the fluid in a chamber 36, which is constantly connected by way of a passage 38 with the valve chamber 23. The diaphragm 34 has at the other face thereof a valve 40 which is adapted to engage a seat rib 42 surrounding a chamber 43, which is connected by way of a passage 44 with a port in the seat of the main slide valve 19 of the service portion 9. The chamber 46 outwardly of the seat rib 42 is connected through a choke 48 and a passage and pipe 50 with the brake cylinder 2.

The emergency portion 10 also includes valve means provided by this invention, and indicated generally by the reference numeral 52, for restricting the rate of flow of fluid to the brake cylinder following an initial inshot of fluid to the brake cylinder at a rapid rate.

This valve means comprises a valve 54 mounted in a chamber 56 and yieldingly urged by means of a spring 58 into engagement with a seat rib 60 surrounding a passage which communicates with a chamber 62. The chamber 62 is constantly connected by way of a passage 64 with the passage 50 leading to the brake cylinder 2.

The chamber 56 is connected by way of a passage 65 with the passage 44 leading from a port in the seat of the main slide valve 18 of the service portion 9, and is connected by way of a choke 66 with the passage 64.

The valve means 52 has a movable abutment in the form of a flexible diaphragm 68, which is subject on one side to the pressure of the fluid in the chamber 62, and on the other side to the pressure of the fluid in a chamber 70, which is constantly connected by way of a passage 72 with the branch passage and pipe 16 and thereby with the brake pipe 1.

The diaphragm 68 has secured to a face thereof a follower 74 having a bore therein which is adapted to receive the end of a stem 76 associated with the valve 54. The follower 74 is adapted to engage projections 78 to limit upward movement of the diaphragm 68, and when the follower is in engagement with the projections 78, the follower 74 engages the end of the stem 76 and maintains the valve 54 away from the seat rib 60 against the opposing force of the spring 58.

In initially charging the equipment, fluid under pressure is supplied to the brake pipe 1, and it flows therefrom by way of the branch pipe and passage 16 to the chamber 14 at the face of the piston 12 of the service portion 9, and on an increase in the pressure of the fluid in the chamber 14 the piston 12 is moved to the right, as viewed in the drawing, to the release position to open communication through a feed groove 80 through which fluid under pressure flows from the chamber 14 to the valve chamber 17 at the other face of the piston 12. Fluid under pressure supplied to the valve chamber 17 flows therefrom by way of a passage and pipe 82 to the auxiliary reservoir 4 to charge this reservoir with fluid at the pressure carried in the brake pipe 1.

On movement of the piston 12 to the release position the auxiliary slide valve 19 opens communication from the valve chamber 17 through a restricted passage 84 through the main slide valve 18, which at this time is in communication with a passage and pipe 86 leading to the emergency reservoir 5 so that fluid under pressure flows at a restricted rate to the emergency reservoir 5 to charge this reservoir at the pressure carried in the brake pipe.

Fluid under pressure supplied from the brake pipe 1 to the branch pipe and passage 16 also flows therefrom to the chamber 22 at the face of the piston 21 of the emergency portion 10, and on an increase in the pressure of the fluid in this chamber the piston 21 is moved to the left, as viewed in the drawing, so as to open communication from the chamber 22 through a restricted port 88 leading to the passage 24, which communicates with the valve chamber 23 and the quick action chamber 25. Fluid under pressure flows from the chamber 22 through the port 88 to the valve chamber 23 and the quick action chamber 25 to charge these chambers with fluid at the pressure carried in the brake pipe.

In addition, fluid under pressure supplied from the brake pipe 1 to the branch pipe and passage 16 flows therefrom by way of the passage 72 to the chamber 70 at the face of the diaphragm 68 of the valve means 52, and moves this diaphragm upwardly, as viewed in the drawing, until the follower 74 engages the projections 78 with the result that the valve 54 is held away from the seat rib 60 to permit communication between the chamber 56 and the chamber 62 past this seat rib.

At this time, as the piston 12 of the service portion 9 is in the release position, a cavity 90 in the main slide valve 18 establishes communication between the passage 44 and an atmospheric passage 92 with the result that the brake cylinder 2 and the chamber 62 of the valve means 52, are connected to the atmosphere.

If it is desired to effect a service application of the brakes a gradual reduction in brake pipe pressure is made, and the piston 12 of the service portion 9 is thereby shifted from the release position by the higher pressure of fluid in the valve chamber 17. The piston 12 first moves the graduating valve 19 to uncover a service port 94 through the main slide valve 18, and to cover the end of the port 84 through the slide valve 18. The main slide valve 18 is then moved upon its seat until the service port 94 registers with the passage 44.

Fluid under pressure is then supplied from the auxiliary reservoir 4 to the brake cylinder 2 by way of the passages 44 and 65 to the chamber 56, past the open valve 54 to the chamber 62 at the face of the diaphragm 68, and thence by way of the passages 64 and 50 to the brake cylinder.

On a service application of the brakes the brake pipe pressure is maintained at a value greater than, or at least equal to the pressure of the fluid supplied to the brake cylinder with the result that the force exerted by the fluid in the chamber 70 of the valve means 52 exceeds the opposing force exerted by the fluid in the chamber 62. The diaphragm 68, therefore, is held in the position in which the follower 74 engages the projections 78 and presses against the end of the stem 76 to hold the valve 54 away from the seat rib 60 to permit fluid supplied by the service portion 9 to flow at a rapid rate to the brake cylinder 2.

Upon a gradual service reduction in brake pipe pressure the emergency piston 21 is moved so as to shift the auxiliary slide valve 29 to a position in which a port 96 through the auxiliary slide valve registers with a port 98 through the main slide valve 28, which in this position of the main slide valve 28 registers with an atmospheric passage 100. The rate at which the pressure of the fluid in the valve chamber 23 and in the quick action chamber 25 is reduced is equal to the rate at which the brake pipe pressure is reduced in effecting a service application so that if the rate of reduction in brake pipe pressure does not exceed the service rate, the piston 21 will not be operated to shift the main slide valve 28 to the emergency application position.

When the brake pipe pressure is increased to effect the release of the brakes, the piston 12 of the service portion 9 is shifted to the release position in which the feed groove 80 is open to permit the recharge of the auxiliary reservoir 4 from the brake pipe, and in which the brake cylinder 2 is connected to the atmosphere through the cavity 90 in the main slide valve 18 as hereinbefore described.

In addition, on this increase in the pressure of the fluid in the brake pipe, the piston 21 of the emergency portion 10 is shifted to the release position and moves the auxiliary slide valve 29 to a position to cut off the venting of fluid from the valve chamber 23, while communication is opened through the port 88 to permit the recharge of the valve chamber 23 and the quick action chamber 25.

Upon a sudden emergency rate of reduction in brake pipe pressure, the piston 12 of the service portion 9 is shifted to the application position as in a service application of the brakes so that fluid under pressure is supplied from the auxiliary reservoir to the passage 44 leading to the brake cylinder as hereinbefore described.

On a reduction in the pressure of the fluid in the brake pipe 1 at an emergency rate, the piston 21 of the emergency portion 10 is shifted to the emergency position and the main slide valve 28 is shifted to a position in which a port 102 therein establishes communication between a passage 104 leading from the emergency reservoir 5, and a passage 106 which communicates with the passage 44 leading to the brake cylinder 2.

In addition, on movement of the main slide valve 28 to the application position a passage 108 is uncovered to permit the flow of fluid under pressure from the valve chamber 23 and the quick action chamber 25 to the vent valve, not shown, incorporated in the emergency portion 10, which is thereupon operated to vent fluid from the brake pipe 16 at a rapid rate, and to vent fluid under pressure from the valve chamber 23 and the quick action chamber 25 at a restricted rate.

Fluid under pressure supplied from the emergency reservoir 5 and the auxiliary reservoir 4 to the passage 44 flows therefrom by way of the passage 65 to the chamber 56, and past the valve 54 at a rapid rate to the chamber 62, from which fluid flows by way of the passages 64 and 50 to the brake cylinder 2 to increase the pressure of the fluid in the brake cylinder at a rapid rate, while there is a similar increase in the pressure of the fluid in the chamber 62 of the valve means 52.

On an emergency application of the brakes the pressure of the fluid in the brake pipe is reduced substantially to atmospheric pressure, and there is a similar reduction in the pressure of the fluid in the chamber 70 of the valve means 52.

When the pressure of the fluid in the chamber 62 builds up to a value exceeding that of the reducing pressure in the chamber 70, the diaphragm 68 is moved downwardly by the fluid under pressure in the chamber 62 to permit the valve 54 to be moved to the seated position by the spring 58 to cut off the rapid flow of fluid from the chamber 56 to the chamber 62 past the seat rib 60. Fluid under pressure supplied from the emergency reservoir 5 and the auxiliary reservoir 4 to the chamber 56 may thereafter flow at a restricted rate through the choke 66 to the passage 64 leading to the brake cylinder 2.

On an increase in the pressure of the fluid in the brake cylinder 2 there is a similar increase in the pressure of the fluid in the chambers 43 and 46 at the face of the diaphragm 34 of the timing valve device 32, while the pressure of the fluid in the chamber 36, which is open to the valve chamber 23 by way of the passage 38, is gradually reduced by venting of fluid at a restricted rate from the valve chamber and the quick action chamber through the vent valve piston.

After a time interval the reducing quick action chamber pressure in the chamber 36 is unable to hold the valve 40 in the seated position against the increasing brake cylinder pressure in the chambers 43 and 46, with the result that the valve 40 is unseated to permit fluid supplied to the passage 44 and the chamber 43 to flow past the seat rib 42 to the chamber 46, from which it flows through the choke 48 to the passage 50 leading to the brake cylinder 2 to increase the rate of flow of fluid to the brake cylinder. Fluid under pressure then continues to flow to the brake cylinder through the chokes 66 and 48 until the pressure of the fluid in the emergency and auxiliary reservoirs equalizes with the pressure of the fluid in the brake cylinder.

It will be seen that on an emergency application of the brakes fluid under pressure is initially supplied to the brake cylinder at a rapid rate past the unseated valve 54 until the brake cylinder pressure is built up to a value exceeding the decreasing brake pipe pressure, at which time the valve means 52 operates to reduce the rate of flow of fluid to the brake cylinder. Thereafter fluid under pressure flows to the brake cylinder at a restricted rate until the brake cylinder pressure exceeds the reducing pressure of the fluid in the quick action chamber, at which time the timing valve device 32 operates to effect an increase in the rate of supply of fluid to the brake cylinder.

When the brake pipe pressure is increased to effect the release of the brakes, the piston 21 of the emergency portion 10 is moved to the release position to open communication through the port 88 to permit the recharge of the valve chamber 23 and the quick action chamber 25 from the brake pipe, while the main slide valve 28 and the auxiliary slide valve 29 cut off the supply of fluid from the quick action chamber to the vent valve, and also cut off communication from the emergency reservoir to the brake cylinder.

On an increase in brake pipe pressure to release the brakes, the piston 12 of the service portion 9 is moved to the release position in which the feed groove 80 is opened to permit the recharge of the auxiliary reservoir 4 and emergency reservoir 5 from the brake pipe, while the slide valve 18 is moved to the position in which the cavity 90 establishes communication between the passage 44 and the atmospheric passage 92. Fluid under pressure is thereupon released from the brake cylinder 2 by way of the pipe and passage 50, passage 64, chamber 62, past the valve 54 to the chamber 56, the valve 54 being moved away from the seat against the spring 58, and from the chamber 56 by way of the passage 65 and passage 44 to the atmosphere.

On an increase in the pressure of the fluid in the quick action chamber 25, and on a reduction in the pressure of the fluid in the brake cylinder, the diaphragm 36 of the timing valve device 32 is moved to the right, as viewed in the drawing, and moves the valve 40 into engagement with the seat rib 42.

On an increase in the pressure of the fluid in the brake pipe, there is an increase in the pressure of the fluid in the chamber 70 of the valve means 52, and when the pressure of the fluid in this chamber has increased to a value exceeding that of the brake cylinder pressure in the chamber 62 at the other face of the diaphragm 68, the diaphragm is moved upwardly so that the follower 74 engages the projections 73, while the valve 54 is held away from the seat rib 60 against the spring 58.

While one embodiment of the improved fluid pressure brake equipment provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake equipment, in combination, a brake cylinder, a brake pipe, valve means operative on a reduction in brake pipe pressure for supplying fluid under pressure to the brake cylinder, and means subject to the opposing pressures of the fluid in the brake pipe and of fluid in the brake cylinder and operated on a predetermined relationship of said pressures to restrict rate of the supply of fluid to the brake cylinder by said valve means.

2. In a fluid pressure brake equipment, in combination, a brake cylinder, a brake pipe, valve means responsive to variations in brake pipe pressure for controlling the supply of fluid under pressure to and the release of fluid under pressure from a passage through which fluid may be supplied to and released from the brake cylinder, a check valve operative to cut off the flow of fluid to the brake cylinder through said passage and to permit the release of fluid from the brake cylinder through said passage, a by-pass extending around said check valve through which fluid may flow to the brake cylinder at a restricted rate, and a movable abutment subject to the opposing pressures of the fluid in the brake pipe and of the fluid in the brake cylinder for unseating said check valve to permit the rapid supply of fluid to the brake cylinder by said valve means.

3. In a fluid pressure brake equipment, in combination, a reservoir, a brake pipe, a brake cylinder, valve means subject to the opposing pressures of the fluid in the reservoir and of the fluid in the brake pipe for supplying fluid from the reservoir to the brake cylinder, and a valve device subject to the opposing pressures of the fluid in the brake pipe and of the fluid in the brake cylinder for controlling the rate of supply of fluid to the brake cylinder by said valve means, said valve device being operated on an increase in the pressure of the fluid in the brake cylinder and on a reduction in brake pipe pressure to restrict the rate of supply of fluid to the brake cylinder.

4. In a fluid pressure brake equipment, in combination, a reservoir, a brake pipe, a brake cylinder, valve means operated upon a reduction in the pressure of the fluid in the brake pipe to supply fluid from the reservoir to the brake cylinder, and a valve device subject to the opposing pressures of the fluid in the brake pipe and of the fluid in the brake cylinder for controlling the rate of supply of fluid to the brake cylinder by said valve means, said valve device being operated on an increase in the pressure of the fluid in the brake cylinder and on a reduction in brake pipe pressure to restrict the rate of supply of fluid to the brake cylinder.

5. In a fluid pressure brake equipment, in combination, a brake cylinder, a brake pipe, a pressure chamber, valve means subject to the opposing pressures of the fluid in the brake pipe and of the fluid in the pressure chamber and operated on a reduction in brake pipe pressure at an emergency rate to supply fluid under pressure to the brake cylinder and to vent fluid from the pressure chamber, a valve device subject to the opposing pressures of the fluid in the brake pipe and of the fluid in the brake cylinder for controlling the supply of fluid by said valve means to the brake cylinder, and means subject to the opposing pressures of the fluid in the brake cylinder and of the fluid in the pressure chamber for also controlling the supply of fluid to the brake cylinder by said valve means.

6. In a fluid pressure brake equipment, in combination, a brake cylinder, a brake pipe, a pressure chamber, valve means subject to the opposing pressures of the fluid in the brake pipe and of the fluid in the pressure chamber and operated on a reduction in brake pipe pressure at an emergency rate to supply fluid under pressure to the brake cylinder and to vent fluid from the pressure chamber, a valve device subject to the opposing pressures of the fluid in the brake pipe and of the fluid in the brake cylinder for controlling the supply of fluid by said valve means to the brake cylinder, said device being operated on an increase in the pressure of the fluid in the brake cylinder and on a reduction in brake pipe pressure to restrict the rate of supply of fluid to the brake cylinder, and means subject to the opposing pressures of the fluid in the brake cylinder and of the fluid in the pressure chamber for also controlling the supply of fluid to the brake cylinder by said valve means, said means being operated on an increase in the pressure of the fluid in said brake cylinder to permit an increase in the rate of supply of fluid to the brake cylinder.

7. In a fluid pressure brake equipment, in combination, a brake cylinder, a brake pipe, valve means operated on a reduction in brake pipe pressure to supply fluid under pressure to a supply passage, means for supplying fluid from said supply passage to the brake cylinder at a restricted rate, and a valve device subject to the opposing pressures of the fluid in the brake cylinder and of the fluid in the brake pipe for supplying fluid from said supply passage to the brake cylinder, said valve device being operated upon an increase in the pressure of the fluid in the brake cylinder and on a reduction in brake pipe pressure to cut off the supply of fluid from the supply passage to the brake cylinder.

8. In a fluid pressure brake equipment, in combination, a brake cylinder, a brake pipe, a reservoir, valve means subject to the opposing pressures of the fluid in the brake pipe and of the fluid in the reservoir for supplying fluid from the reservoir to a supply passage, means for supplying fluid from said supply passage to the brake cylinder at a restricted rate, and a valve device subject to the opposing pressures of the fluid in the brake cylinder and of the fluid in the brake pipe for supplying fluid from said supply passage to the brake cylinder, said valve device being operated on an increase in the pressure of the fluid in the brake cylinder and on a reduction in brake pipe pressure to cut off the supply of fluid from said supply passage to the brake cylinder.

9. In a fluid pressure brake equipment, in combination, a brake cylinder, a brake pipe, valve means responsive to variations in brake pipe pressure for supplying fluid under pressure to and for releasing fluid from a supply passage, means for supplying fluid under pressure from said supply passage to the brake cylinder at a restricted rate, a valve device subject to the opposing pressures of the fluid in the brake cylinder and of the fluid in the brake pipe for supplying fluid from said supply passage to the brake cylinder, and valve means operative to permit fluid to flow from the brake cylinder to said supply passage and to prevent flow of fluid from said supply passage to the brake cylinders.

10. In a fluid pressure brake equipment, in combination, a brake cylinder, a brake pipe, valve means responsive to variations in brake pipe pressure for supplying fluid under pressure to and for releasing fluid under pressure from a supply passage, a check valve controlling a communication through which fluid may flow between the brake cylinder and the supply passage at a rapid rate, means yieldingly urging said check valve to the seated position to prevent flow from the supply passage to the brake cylinder, a movable abutment subject to the opposing pressures of fluid in the brake pipe and of the fluid in the brake cylinder and operative on an increase in the pressure of the fluid in the brake cylinder to permit said check valve to be moved to its seat and prevent the flow of fluid from the supply passage to the brake cylinder, and a by-pass through which fluid may flow from the supply passage to the brake cylinder.

11. In a fluid pressure brake equipment, in combination, a brake cylinder, a brake pipe, a pressure chamber, a vent valve operated on the supply of fluid under pressure to vent fluid from the brake pipe, valve means subject to the opposing pressures of the fluid in the brake pipe and of the pressure chamber and operated on a reduction in the pressure of the fluid in the brake pipe at an emergency rate to supply fluid to the vent valve, to vent fluid from the pressure chamber at a restricted rate, and to supply fluid to the brake cylinder, a valve device subject to the opposing pressures of the fluid in the brake pipe and of the fluid in the brake cylinder for controlling the rate of supply of fluid by said valve means to the brake cylinder, and means subject to the opposing pressures of the fluid in the pressure chamber and of the fluid in the brake cylinder for also controlling the rate of supply of fluid by said valve means to the brake cylinder.

EVERETT P. SEXTON.